(12) United States Patent
Hanai et al.

(10) Patent No.: US 9,057,440 B2
(45) Date of Patent: Jun. 16, 2015

(54) CONTROL UNIT FOR SYNCHRONOUS ENGAGING DEVICE

(71) Applicant: HONDA MOTOR CO., LTD, Tokyo (JP)

(72) Inventors: Eiji Hanai, Wako (JP); Katsuhisa Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 4 days.

(21) Appl. No.: 13/909,250

(22) Filed: Jun. 4, 2013

(65) Prior Publication Data

US 2014/0005903 A1    Jan. 2, 2014

(30) Foreign Application Priority Data

Jun. 27, 2012   (JP) ................. 2012-144294

(51) Int. Cl.
| | |
|---|---|
| *F16H 61/68* | (2006.01) |
| *F16H 57/01* | (2012.01) |
| *F16D 48/06* | (2006.01) |
| *F16H 61/16* | (2006.01) |
| *F16H 61/18* | (2006.01) |
| *F16H 59/46* | (2006.01) |
| *F16D 23/06* | (2006.01) |

(52) U.S. Cl.
CPC ............... *F16H 61/68* (2013.01); *F16H 61/16* (2013.01); *F16H 61/18* (2013.01); *F16H 2059/462* (2013.01); *F16H 57/01* (2013.01); *F16H 2057/014* (2013.01); *F16D 2023/0656* (2013.01); *F16D 48/06* (2013.01); *F16D 2500/10456* (2013.01); *F16D 2500/3026* (2013.01); *F16D 2500/30415* (2013.01); *F16D 2500/30426* (2013.01); *F16D 2500/5023* (2013.01); *F16D 2500/50233* (2013.01)

(58) Field of Classification Search
CPC ....... F16H 61/686; F16H 61/68; F16H 61/16; F16H 61/18
See application file for complete search history.

(56) References Cited

U.S. PATENT DOCUMENTS

| | | | | |
|---|---|---|---|---|
| 2002/0058567 | A1* | 5/2002 | Rogg | .............. 477/71 |
| 2008/0215218 | A1* | 9/2008 | Watanabe et al. | .............. 701/62 |

FOREIGN PATENT DOCUMENTS

| | | | |
|---|---|---|---|
| JP | 2002-071005 A | | 3/2002 |
| JP | 2006-153235 A | | 6/2006 |
| JP | 2006153235 A | * | 6/2006 |

* cited by examiner

*Primary Examiner* — John R Olszewski
*Assistant Examiner* — Jason Roberson
(74) *Attorney, Agent, or Firm* — Westerman, Hattori, Daniels & Adrian, LLP (57) ABSTRACT

When a synchronizing sleeve that is driven by an actuator in response to gear shift request is stroked from a release position to an engagement position, a differential rotation speed between an input rotation and an output rotation is calculated at stroke positions after a synchronization completion position; and when the said differential rotation speed is equal to or more than a predetermined threshold value, a damage determination index is calculated based on the said differential rotation speed. Further, when a cumulative value of the damage determination index accumulated for each gear position becomes equal to or more than a predetermined threshold value, the engagement operation of the gear position corresponding to the said cumulative value is disabled. This makes it possible to effectively determine the degree of damage when a gear whine occurs to a synchronized engaging device.

5 Claims, 8 Drawing Sheets

CONTROL UNIT FOR SYNCHRONOUS ENGAGING DEVICE

CROSS-REFERENCE TO RELATED APPLICATION

The present disclosure relates to subject matter contained in Japanese Patent Application No. 2012-144294, filed on Jun. 27, 2012, the disclosure of which is expressly incorporated herein by reference in its entirety.

BACKGROUND OF THE INVENTION

1. Field of the Invention

The present invention relates to the a control unit for a synchronous engaging device that is provided in a transmission, and in particular, it relates to a control unit that can detect the degree of damage when a gear whine occurs to the synchronous engaging device.

2. Description of the Related Art

As a transmission installed in a vehicle, there is a multistep transmission equipped with an input shaft to which driving force of a driving source such as a motor is input, an output shaft which is arranged in parallel with the input shaft, one or more input gears (or shift gears), being provided on the input shaft, for transmitting rotation of the input shaft, and one or more output gears (or shift gears), being provided on the output shaft, for meshing with each of the one or more input gears. Also, such a transmission is provided with a synchronous engaging device (or a synchronizer device) for synchronizing and engaging the rotation of the input gear or the output gear with the rotation of the input shaft or the output shaft. This synchronous engaging device has a synchronizing sleeve that can be stroked in the axial direction between the engaging position in which the input gear or the output gear engages with the input shaft or the output shaft and the release position in which the engagement is released.

In the synchronous engaging device as described above, due to the functional decline of a synchronizer ring, a synchronous engagement operation is not completed even when the stroke position of the synchronizing sleeve is in the position in which the synchronous engagement operation should be essentially completed, but instead differential rotation speed occurs between the rotational speed of the input side and the rotational speed of the output side. In this condition, when a tip of dog tooth of the synchronous sleeve and a tip of dog tooth of the shift gear come in contact, an abnormal noise such as a metal frictional sound or a clattering sound occurs between them because of relative rotation. In this specification, the state in which such an abnormal noise occurs is referred to as gear whine state. If the synchronous engagement operation is performed continuously and repeatedly in the gear whine state, it may eventually lead to the damage of each parts of the synchronous engaging device (such as shift forks, dog tooth, hub sleeves, etc.).

The existence of gear whine has conventionally been determined by differential rotation speed in accordance with stroke position of the synchronizing sleeve. In other words, in the shift control unit described in Japanese Patent Application Publication No. 2006-153235 (Patent Document 1), when it is detected that the sleeve has reached the mesh starting position where it begins to mesh with an idling gear and when the relative rotational speed between the input shaft and the output shaft does not fall within the synchronization decision value that determines the completion of synchronization, it is determined that a gear whine has occurred. Moreover, in the shift control unit described in Japanese Patent Application Publication No. 2002-71005 (Patent Document 2), when the relative rotational speed between an input rotational speed and an output rotational speed is equal to or more than a predetermined value and the amount of displacement of the sleeve is equal to or more than a predetermined value, it is determined that a gear whine has occurred.

Furthermore, the conventional technologies described in Patent Documents 1 and 2 take measures to prevent further damages to the mechanical structure of the synchronous engaging device after and while determining gear whine. The shift control unit described in Patent Document 1 does not immediately disable the gear position which has generated a gear whine, but uses the gear position while suppressing the gear whine by changing the control method of engagement operation so as to reduce damage caused to the transmission. The shift control unit disclosed in Patent Document 2, when it is determined that gear whine has occurred more frequently than a predetermined number in a specific gear position, identifies the gear position as gear whine position, whereas performing shift control by skipping the gear whine position.

SUMMARY OF THE INVENTION

However, an approach, such as in the conventional technologies mentioned above that only determines the presence of gear whine from the differential rotation speed in accordance with stroke of sleeve, counts the number of occurrences of gear whines, and takes measures such as disabling the gear in question when the number of occurrences is equal to or more than a predetermined number, cannot determine the degree of damage (or the magnitude of damage) that is being sustained by a synchronous engaging device and a synchronous fork. Thus, this approach may disable a gear which is usable with low degree of damage, and on the contrary, allow a gear which should not be used with high degree of damage. Moreover, there is a risk that replacement of parts that need not be replaced is deemed necessary, and on the contrary, replacement of parts that need to be replaced is deemed unnecessary.

In view of the above-described problem, the present invention has an object to provide a control unit for a synchronous engaging device that can more appropriately determine the degree of damage sustained by the synchronous engaging device when a gear whine occurs.

In order to solve the problem mentioned above, a control unit for synchronous engaging device according to the present invention includes: an input shaft (18) of a transmission (2); one or more input gears (32, 34) that are installed on the input shaft (18) to transmit rotation of the input shaft (18); an output shaft (13) that is arranged in parallel with the input shaft (18); one or more output gears (41, 43) that are installed on the output shaft (13) to engage with each of the one or more input gears (32, 34); a synchronous engaging device (S2) having a sleeve (60) capable of being stroked between an engaging position that engages by synchronizing rotation of either of the input gears (32, 34) with rotation of the input shaft (18) or by synchronizing rotation of either of the output gears (41, 43) with the output shaft (13), and a release position that releases such engagement; an actuator (6) for driving the sleeve (60); a control section (5) for controlling the synchronous engagement operation by the synchronous engaging device (S2); a rotation detection section (202, 203) that detect input rotation (N1) on the input shaft (18) side and output rotation (N0) on the output shaft (13) side; an acquisition section for stroke position information (205) for acquiring information related to a stroke position of the sleeve (60); and a storage section (7) that stores damage determination indices (D), for determining degree of damage to the synchronous engaging device (S2), that are set according to differential rotation speed between the input rotation (N1) and the output rotation (NO); wherein the control section (5) calculates a differential rotation speed (Nd) between the input rotation (N1) and the output rotation (NO) in stroke positions after the synchronization completion position that is judged as a position where synchronization of rotations of the input gears (32, 34) or the output gears (41, 43) and rotations of the input shaft (18) or the output shaft (13) is complete, when the sleeve (60) driven by the actuator (6) is stroked from the release position to the engaging position in response to the shift request, and calculates damage determination index (D) based on the said differential rotation speed (Nd) when the said differential rotation speed (Nd) is equal to or more than a predetermined threshold value (Nth).

The control unit for synchronous engaging device according to the present invention is designed to determine that a gear whine is occurring when a differential rotation speed between an input rotation and an output rotation is equal to or more than a predetermined threshold value in stroke positions after the synchronization completion position in the synchronous engaging device, and then to calculate a damage determination index taking into account the degree of damage sustained by a gear or each part of the synchronous engaging device on the basis of the differential rotation speed. This enables to take measures, when a gear whine is occurring in the synchronous engaging device, such as disabling a gear to which a gear whine is occurring with appropriate safety factor before resulting in damage to parts of the synchronous engaging device and gathering data for recommending replacement of parts. On the other hand, this enables to effectively prevent improper measures such as disabling a gear or a synchronous engaging device that is actually usable and gathering data for recommending replacement of parts that need not be replaced.

Further, the above-described control unit for synchronous engaging device is provided with multiple input gears (32, 34) and multiple output gears (41, 43), multiple gear positions can be set by engagement switching of these multiple input gears (32, 34) and multiple output gears (41, 43), damage determination index (D) corresponding to differential rotation speed (Nd) is set for every multiple of gear positions, and the control section (5) should the accumulate damage determination index (D) calculated for every multiple of gear positions.

This configuration enables, when a gear that constitutes each gear position or a corresponding synchronous engaging device sustains damage, to properly ascertain the degree of damage and take measures such as disabling the gear position depending on the degree of damage. Therefore, improper measures such as disabling a gear position that is actually usable and allowing use of a gear position that should actually be disabled can be avoided, and appropriate measures depending on the degree of damage sustained by the gear or the synchronous engaging device can be taken.

Further, in the above-described control unit for synchronous engaging device, a synchronization completion position where synchronization of rotation of the input gears (32, 34) or the output gears (41, 43) with rotation of the input shaft (18) or the output shaft (13) is judged to be complete may be a balk completion position where the sleeve (60) contacts the input gear (32, 34) side or the output gear (41, 43) side.

In the original state where no part of the synchronous engaging device is subject to damage such as wear, there is no differential rotation speed between rotational speed on the input side and rotational speed on the output side after a balk completion position where the sleeve contacts the input gear side or the output gear side. Therefore, setting the above-described balk completion position as synchronization completion position and thus calculating damage determination indices based on the differential rotation speed of positions thereafter enables to more effectively determine the degree of damage sustained by the synchronous engaging device, etc.

Further, in the above-described control unit for synchronous engaging device, when a cumulative value (Ds) of damage determination indices (D) accumulated for each gear position becomes equal to or more than a predetermined threshold value (Dth), the control section (5) should disable engagement operation of the gear position corresponding to the cumulative value (Ds).

By disabling engagement operation of a gear position where a damage determination index becomes equal to or more than a predetermined threshold value, further occurrences of gear whine in the gear position can be prevented. Moreover, while continuation of engagement operation of a gear position where a gear whine is occurring may lead to damage to the gear or parts of a synchronous engaging device, disablement of engagement of the said gear position can avoid damage to the gear or the synchronous engaging device.

Further, estimation of presence or absence of malfunction of each component part of a synchronous engaging device including input gears and output gears, or necessity or unnecessity of their replacement is associated with an above-described damage determination index (D). Depending on magnitude of the damage determination index (D), the control section (5) should determine the type and number of parts that are estimated to be in malfunction or in need of replacement.

Thus, since the type and number of parts that are estimated to be in malfunction or in need of replacement can be determined based on the magnitude of damage determination index, it is possible, according to the degree of damage sustained by the synchronous engaging device, to compile appropriate data related to presence or absence of malfunction or necessity or unnecessity of replacement corresponding to each of its component parts. It is noted that the above characters in parentheses represent, by way of example, reference characters of components of embodiments to be described herein later.

A control unit for a synchronous engaging device according to the present invention can properly determine the degree of damage sustained by the synchronous engaging device when a gear whine occurs and enables to take appropriate measures such as disabling engagement of a gear position or replacing parts according to the degree of damage.

DETAILED DESCRIPTION OF THE INVENTION

Figure 1:
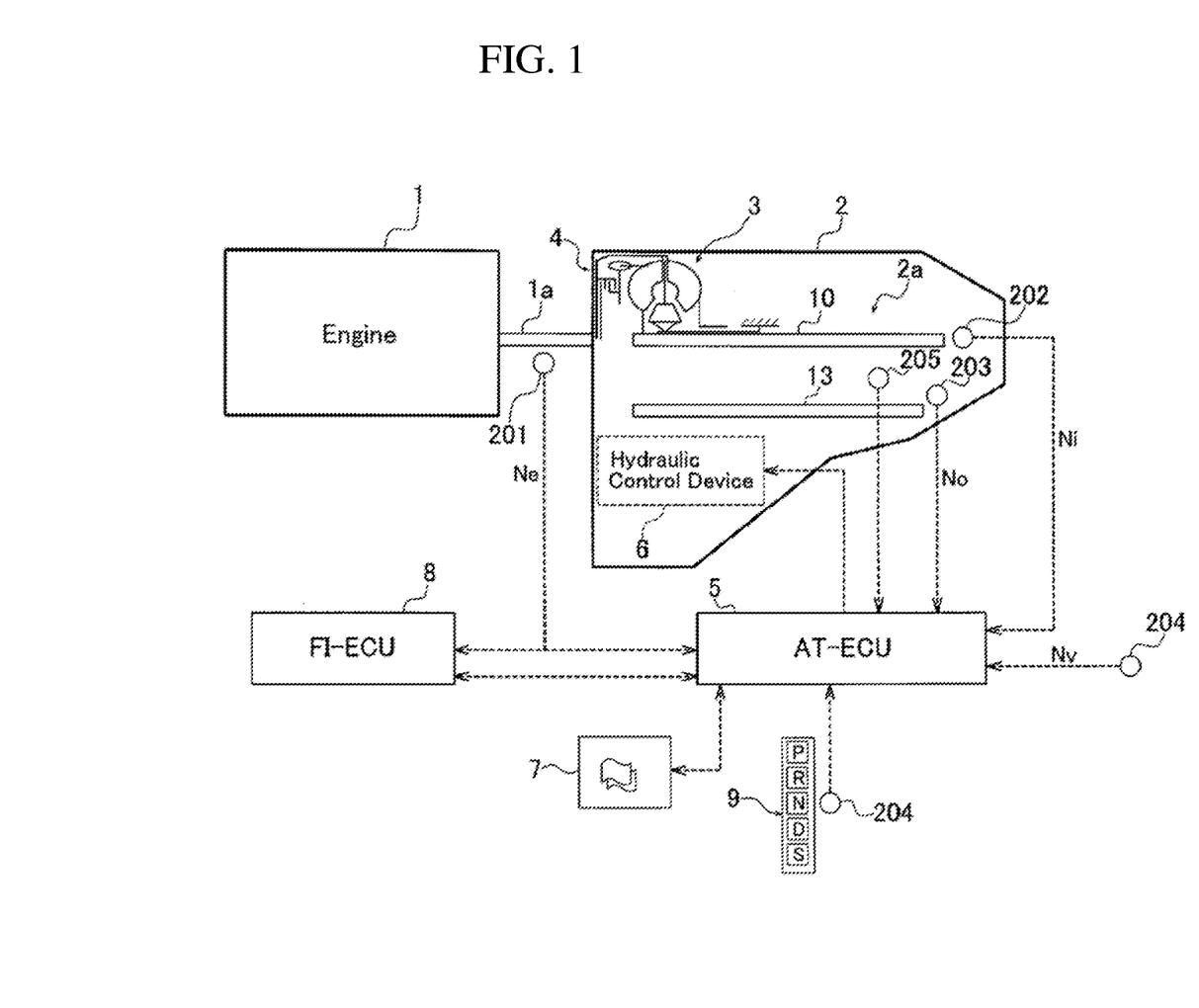
FIG. 1 is a schematic configuration diagram of drive system and control system of a vehicle provided with a control unit for a synchronous engaging device in accordance with one embodiment of the present invention.
Figure 2:
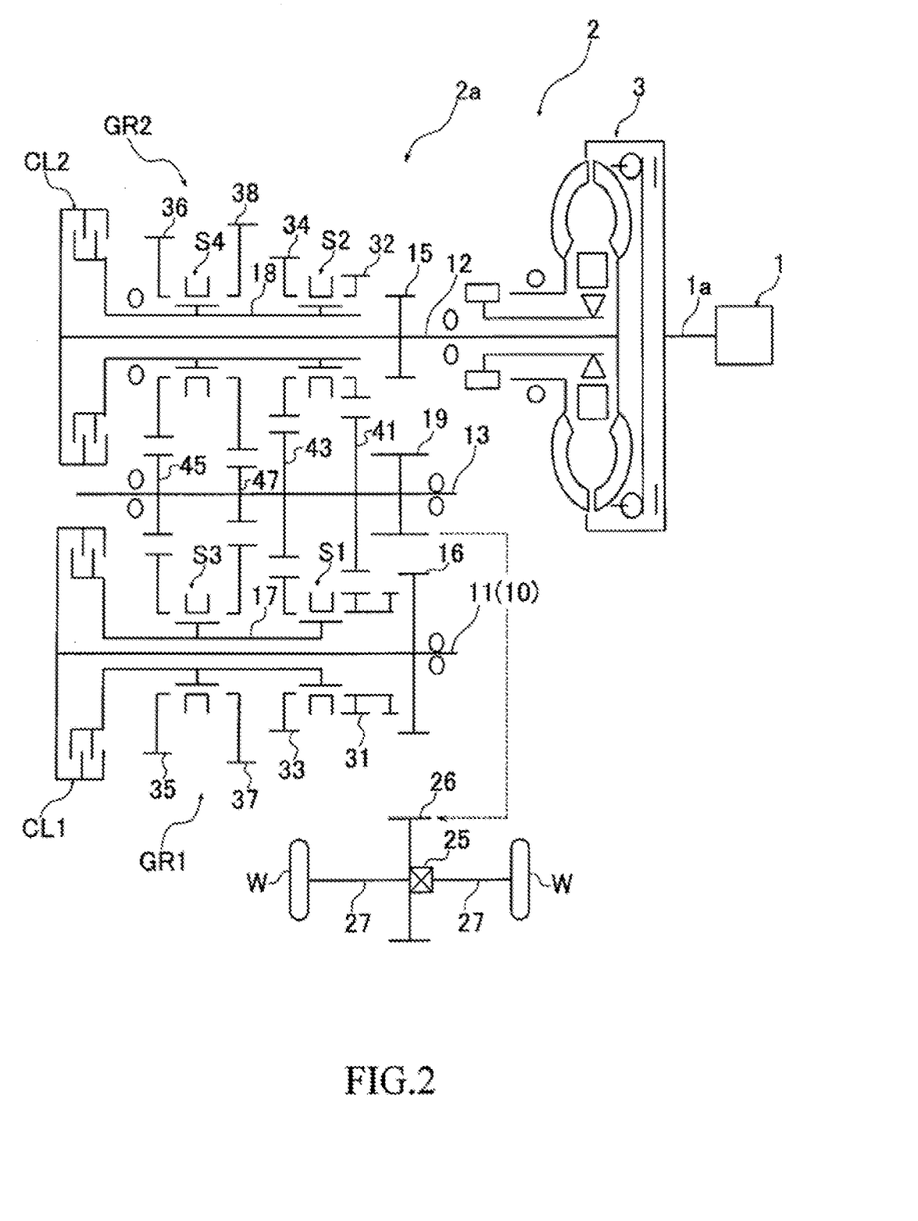
FIG. 2 is a skeleton diagram showing a configuration example of a transmission.

Hereinafter, an embodiment of the present invention will be described in detail with reference to the appending drawings. FIG. 1 is a schematic configuration diagram of drive system and control system of a vehicle provided with a control unit for synchronous engaging device in accordance with an embodiment of the present invention. FIG. 2 is a skeleton diagram of a transmission (or a twin-clutch type automatic transmission). As shown in FIG. 1, a vehicle of the present embodiment comprises an engine 1 and a transmission 2 to which driving force of the engine 1 is transmitted via a hydraulic torque converter 3. The transmission 2 comprises a stepped transmission mechanism 2a. In addition, this vehicle comprises FI-ECU 8 that controls the engine 1, AT-ECU (or control section) 5 that controls the transmission 2, and a hydraulic controller (or an actuator) 6 for controlling rotary drive of the torque converter 3 or fastening control of a lock-up clutch 4 and multiple friction engagement elements CL1, CL2 provided by the transmission mechanism 2a of the transmission 2 or operations of synchronous engaging devices S1-S4 (ref. to FIG. 2).

Rotation output of the engine 1 is output to a crankshaft (or an output shaft of the engine 1) 1a. Rotation of the crankshaft 1a is transmitted to a main shaft 10 of the transmission 2 (or 1st and 2nd input shafts 11, 12 described later) via the torque converter 3 with the lock-up clutch 4. Known configurations can be applied to the torque converter 3, and a detailed description thereof is dispensed with. The transmission 2 comprises the stepped transmission mechanism 2a, for example, with 8 forward gears and 1 reverse gear. The configuration of the transmission mechanism 2a will be described later.

Rotation torque of the main shaft 10 is transmitted to a countershaft (an output shaft) 13 via the transmission mechanism 2a as shown in FIG. 2. In addition, rotation torque of the countershaft 13 is transmitted to drive wheels W, W of the vehicle via gear trains 19, 26 and a differential mechanism 25 as shown in FIG. 2.

Figure 6:
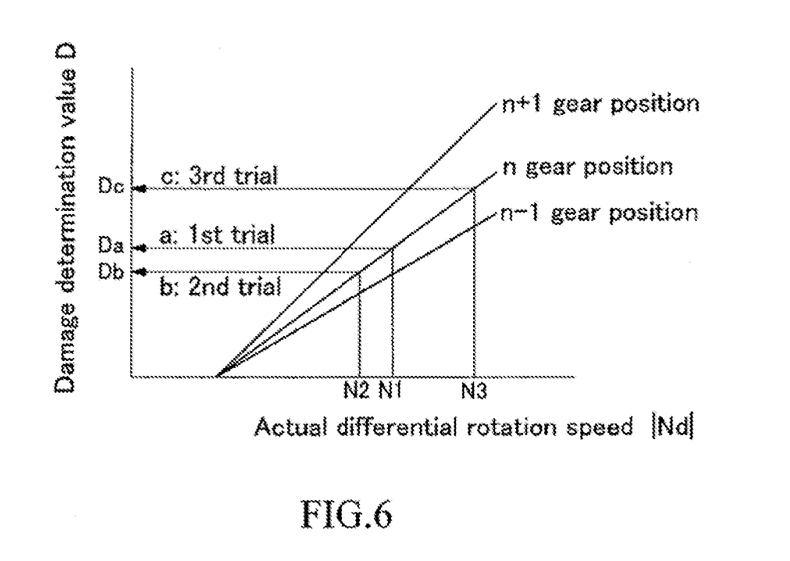
FIG. 6 is a graph showing the relationship between differential rotation speed between input rotational speed and output rotational speed for each gear position and damage determination index.

In the vicinity of the crankshaft 1a, a crankshaft rotational speed sensor 201 is installed for detecting a rotational speed Ne of the crankshaft 1a (or a rotational speed of the engine 1). In the vicinity of the main shaft 10, a main shaft rotational speed sensor 202 is installed for detecting rotational speed (or input shaft rotational speed of the transmission 2) Ni of the main shaft 10. In the vicinity of the countershaft 13, a countershaft rotational speed sensor 203 is installed for detecting rotational speed (or output shaft rotational speed of the transmission 2) No. Rotational speed data which are detected by the rotational speed sensors 201-203 are output to the AT-ECU 5. Also, this vehicle comprises a ROM (or a storage section) 7 that stores various data such as data of damage determination index (for example, data as shown in FIG. 6) for determining degree of damage sustained by the synchronous engaging device S2, which will be described later. The FI-ECU 8 and the AT-ECU 5 can exchange data with the ROM 7.

Moreover, a stroke sensor (or a stroke position information acquisition section) 205, for detecting stroke positions of sleeves provided by the synchronous engaging devices S1-S4, is installed in each of the synchronous engaging devices S1-S4 (ref. to FIG. 2) provided by the transmission 2. Detection signals from the stroke sensor 205 is output to the AT-ECU 5.

In addition, the vehicle of the present embodiment comprises a shifting device 9 to be operated by a driver via a shift lever. The shifting device 9 has positions of the shift lever (not shown in the figures) such as P (parking), R (reverse movement), N (neutral), D (forward movement in automatic transmission mode or in normal mode) and S (forward movement in sports mode) as shown in FIG. 1. In the vicinity of the shifting device 9, a shift lever position sensor 204 is installed. The shift lever position sensor 204 detects a position of the shift lever operated by the driver.

Based upon detected data input from each of the sensors 201-205 or various data input from the FI-ECU 8, the AT-ECU 5 controls an electromagnetic valve that drives a valve group inside the hydraulic controller 6 so as to control the friction engagement elements (such as 1st and 2nd clutches CL1, CL2, which will be described later) or the engagement switching devices (such as the synchronous engaging devices S1-S4) driven by hydraulic pressure.

The transmission mechanism 2a as shown in FIG. 2 is a twin-clutch type automatic transmission mechanism that can be set to eight forward gears and one backward gear. This transmission mechanism 2a comprises a 2nd input shaft 12 into which driving force of the engine (or the motor) 1 is input via the torque converter 3, a 1st input shaft 11 that is placed in parallel with the said 2nd input shaft 12, and the output shaft 13. A drive gear 15 that is fixed on the 2nd input shaft 12 engages with a driven gear 16 that is fixed on the 1st input shaft 11. Therefore, the 2nd input shaft 12 and the 1st input shaft 11 are always connected via the drive gear 15 and the driven gear 16, and rotate in an opposite direction in a constant rotational speed ratio determined by the number of teeth of the drive gear 15 and driven gear 16. While the transmission mechanism 2a is equipped with mechanism such as a reverse shaft and a reverse gear for setting a reverse gear position, an illustration and explanation thereof are omitted here.

A 1st clutch (or a clutch for odd gear positions) CL 1 is arranged at the axial end of the 1st input shaft 11. The 1st clutch CL1 switches engagement and disengagement between the 1st input shaft 11 and a 1st outer circumferential shaft 17 that is fitted rotatably relative to outer periphery of the 1st input shaft 11. A 1st speed drive gear 31, a 3rd speed drive gear 33, a 5th speed drive gear 35, and a 7th speed drive gear 37 are supported rotatably relative to the 1st outer circumferential shaft 17. The 1st speed drive gear 31 and the 3rd speed drive gear 33 are selectively combinable with the 1st outer circumferential shaft 17 by the 1st to 3rd speed synchronous engaging device S1, and the 5th speed drive gear 35 and the 7th speed drive gear 37 are selectively combinable with the 1st outer circumferential shaft 17 by the 5th to 7th speed synchronous engaging device S3.

Also, a 2nd clutch (a clutch for even gear positions) CL2 is arranged at the axial end of the 2nd input shaft 12. The 2nd clutch CL2 switches engagement and disengagement between the 2nd input shaft 12 and a 2nd outer circumferential shaft (or an input shaft) 18 that is fitted rotatably relative to outer periphery of the 2nd input shaft 12. Input gears such as a 2nd speed drive gear 32, a 4th speed drive gear 34, a 6th speed drive gear 36, and an 8th speed drive gear 38 are supported rotatably relative to the 2nd outer shaft 18. The 2nd speed drive gear 32 and the 4th speed drive gear 34 are selectively combinable with the 2nd outer circumferential shaft 18 by the 2nd to 4th speed synchronous engaging devices S2, and the 6th speed drive gear 36 and the 8 speed drive gear 38 are selectively combinable with the 2nd outer circumferential shaft 18 by the 6th to 8th speed synchronous engaging devices S4.

Output gears such as a 1st to 2nd speed driven gear 41, a 3rd to 4th speed driven gear 43, a 5th to 6th speed driven gear 45, and a 7th to 8th speed driven gear 47 are fixed on the output shaft 13. The 1st speed drive gear 31 on the 1st outer circumferential shaft 17 and the 2nd speed drive gear 32 on the 2nd outer circumferential shaft 18 mesh with the 1st to 2nd speed driven gear 41. The 3rd speed drive gear 33 on the 1st outer circumferential shaft 17 and the 4th speed drive gear 34 on the 2nd outer circumferential shaft 18 mesh with the 3rd to 4th speed driven gear 43. The 5th speed drive gear 35 on the 1st outer circumferential shaft 17 and the 6th speed drive gear 36 on the 2nd outer circumferential shaft 18 mesh with the 5th to 6th speed driven gear 45. The 7th speed drive gear 37 on the 1st outer circumferential shaft 17 and the 8th speed drive gear 38 on the 2nd outer circumferential shaft 18 mesh with the 7th to 8th speed driven gear 47.

A final drive gear 19 fixed on the output shaft 13 meshes with a final driven gear 26 installed in the differential mechanism 25, and drive wheels W, W are connected with axles 27, 27 extending right and left from the differential mechanism 25.

A 1st transmission mechanism (or a 1st engagement switching section) GR1 for setting odd gear positions consists of the 1st clutch CL1, the 1st, 3rd, 5th and 7th speed drive gears 31, 33, 35, 37 installed on the 1st outer circumferential shaft 17, the 1st to 3rd speed synchronous engaging device S1, and the 5th to 7th speed synchronous engaging device S3. A 2nd transmission mechanism (or a 2nd engagement switching section) GR2 for setting even gear positions consists of the 2nd clutch CL2, and the 2nd, 4th, 6th and 8th speed drive gears 32, 34, 36, 38 installed on the 2nd outer circumferential shaft 18, the 2nd to 4th speed synchronous engaging device S2, and the 6th to 8th speed synchronous engaging device S4.

In this transmission 2, when the 1st clutch CL1 is engaged, driving force of the crankshaft 1a of the engine 1 is transmitted to the 1st transmission mechanism GR1 via the route: the torque converter 3 the drive gear 15 on the 2nd input shaft 12 the driven gear 16 on the 1st input shaft 11 the 1st input shaft 11 the 1st clutch CL1. On the other hand, when the 2nd clutch CL2 is engaged, driving force of the crankshaft 1a of the engine 1 is transmitted to the 2nd transmission mechanism GR2 via the route: the torque converter 3→the 2nd input shaft 12→the 2nd clutch CL2.

Therefore, the 1st speed gear position is established by moving the 1st to 3rd speed synchronous engaging device S1 to right and engaging the 1st clutch CL1 in the state that the 1 speed drive gear 31 is combined with the 1st outer circumferential shaft 17; the 2 speed gear position is established by moving the 2nd to 4th speed synchronous engaging device S2 to right and engaging the 2nd clutch CL2 in the state that the 2nd speed drive gear 32 is combined with the 2nd outer circumferential shaft 18; the 3 speed gear position is established by moving the 1st to 3rd speed synchronous engaging device S1 to left and engaging the 1st clutch CL1 in the state that the 3 speed drive gear 33 is combined with the 1st outer circumferential shaft 17; and the 4th speed is established by moving the 2nd to 4th speed synchronous engaging device S2 to left and engaging the 2nd clutch CL2 in the state that the 4th speed drive gear 34 is combined with the 2nd outer circumferential shaft 18. Thereafter too, each gear position up to the 8th gear position can be set by switching engagement of the synchronous engaging devices S1-S4 with the 1st and 2nd clutches CL1, CL2.

When shifting up from the 1st to the 8th gear position, the 2nd gear position is established by pre-shifting the 2nd gear while the 1st gear is established by engaging the 1st clutch CL1, and then disengaging the 1st clutch CL1 and engaging the 2nd clutch CL2. The 3rd gear is established by pre-shifting the 3rd gear while 2nd gear is established by engaging the 2nd clutch CL2, and then disengaging the 2nd clutch CL2 and engaging the 1st clutch CL1. Upshifting is performed by repeating this procedure sequentially.

On the other hand, when shifting down from the 8th to the 1st gear, the 7th gear is established by pre-shifting the 7th gear position while the 8th gear position is established with the 2nd clutch CL2 engaged, and then disengaging the 2nd clutch CL2 and engaging the 1st clutch CL1. The 6th gear is established by pre-shifting the 6th gear while the 7th gear position is established with the 1st clutch CL engaged, and then disengaging the 1st clutch CL1 and engaging the 2nd clutch CL2. Downshifting is performed by repeating this procedure. These procedures enable upshifting and downshifting with uninterrupted driving force.

Figure 3:
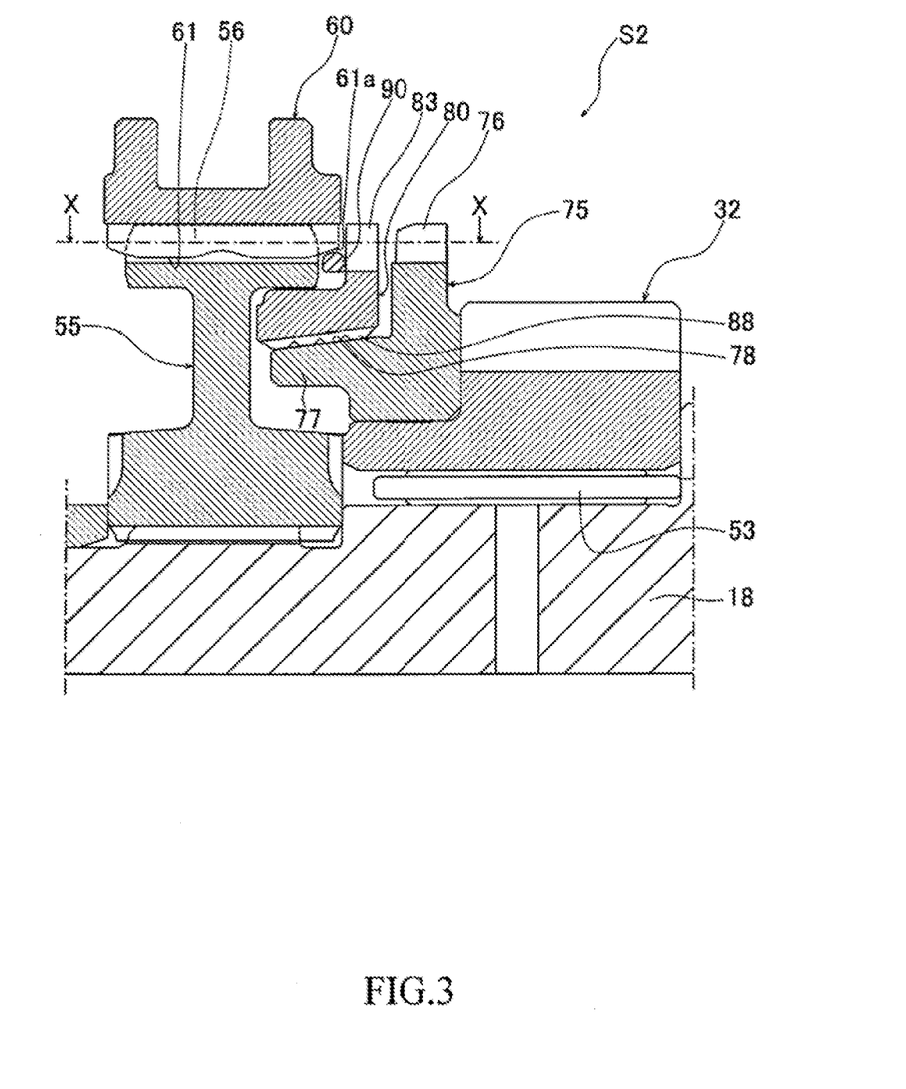
FIG. 3 is a sectional side view showing a configuration example of the synchronous engaging device.
Figure 4:
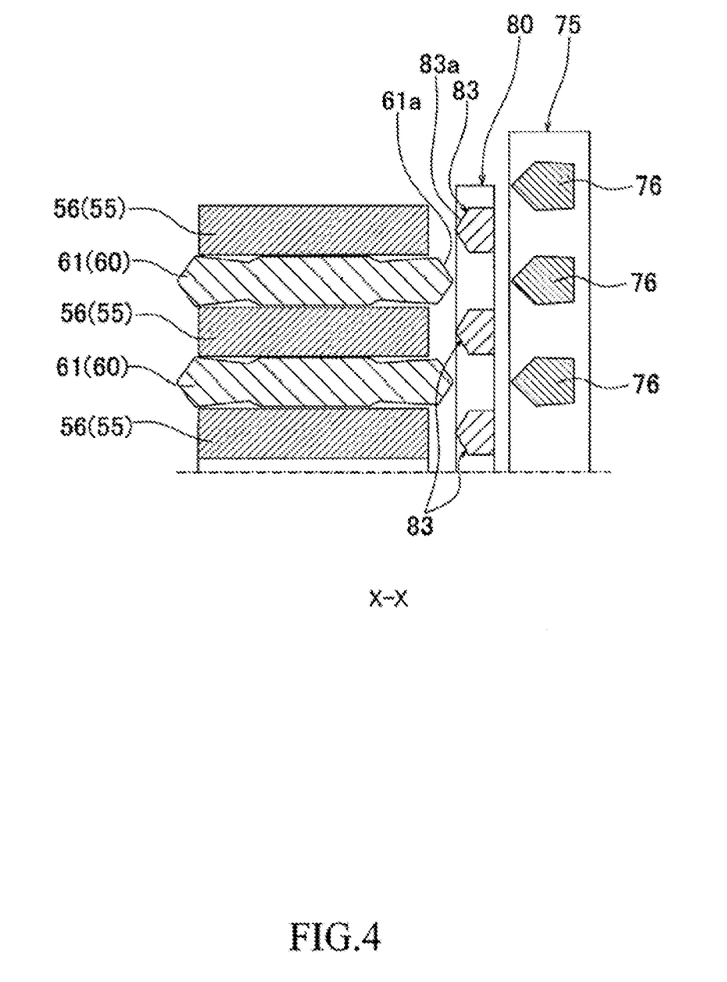
FIG. 4 is a diagram showing an X-X cross-section view of FIG. 3.

FIG. 3 is a sectional side view showing a detailed configuration example of a synchronous engaging device, and FIG. 4 is a X-X cross-sectional view of FIG. 3. Synchronous engaging device shown in FIG. 3 is the synchronous engaging device S2 that can set the 2nd and 4th gear positions. While the synchronous engaging device S2 as shown in FIG. 2 is symmetrically equipped with a synchronization mechanism for the 2nd gear and a synchronization mechanism for the 4th gear that are substantially the same configuration, FIG. 3 only illustrate the synchronization mechanism for the 2nd gear on the right side. In the description below, the control unit according to the present invention will be described by taking the 2nd synchronous engaging device S2 as an example from the multiple synchronous engaging devices S1-S4 provided by the transmission 2.

The synchronous engaging device S2 comprises a synchronizer hub 55 that is spline-fitted on the 2nd outer circumferential shaft (hereinafter referred to also as "input shaft") 18, a synchronizing sleeve 60 that is spline-coupled on outer periphery of a synchronizer hub 55 being slidable to the axial direction, and the 2nd speed drive gear (or the shift gear) 32 installed on the side of the axial direction of the synchronizer hub 55 and the synchronizing sleeve 60. The shift gear 32 is rotatably supported on the 2nd outer circumferential shaft 18 via a needle bearing 53. On the synchronizer hub 55 side of the 2nd speed drive gear 32, a dog gear 75, on whose outer periphery a dog spline 76 is formed, is spline-fitted. With slide of the shift fork that is not shown in the figure, the synchronizing sleeve 60 moves along the axial direction, from a neutral position (or a release position) to left and right engaging positions as shown in FIG. 3. The 2nd speed gear position is established by moving to the 2nd speed position on the right side.

Spline teeth 56 are formed on the outer peripheral surface of the synchronizer hub 55, and spline teeth 61 that engage with the spline teeth 56 of the synchronizer hub 55 are formed on the inner peripheral surface of the synchronizing sleeve 60. As shown in FIG. 4, a chamfer surface 61a that is chamfered into a pointed tip is formed on the end of the axial direction of the spline teeth 61.

As shown in FIG. 3, a taper cone surface 78 composed of an inclined surface that is conically inclined in the axial direction is formed on outer periphery of a boss section 77 that extends to the synchronizer hub 55 side of the dog gear 75. A blocking ring (or a synchronizer ring) 80 is fitted to the outer diameter side of the taper cone surface 78. The blocking ring 80 is a circular ring component with a predetermined width, on whose inner peripheral surface a taper cone surface 88 composed of a conical inclined surface that slidingly contacts the taper cone surface 78 of the boss section 77 is formed.

Multiple dog tooth 83 projecting outwardly in the radial direction are formed on the outer peripheral surface of the blocking ring 80. In addition, a chamfer surface 83a that is chamfered into a pointed tip is formed also on the end of the axial direction of the dog tooth 83 (or the end on the synchronizing sleeve 60 side). Also, as shown in FIG. 3, an annular synchronizer spring 90 is equipped on the outer periphery of the blocking ring 80.

In the synchronous engagement mechanism of the above-described configuration, when the synchronizing sleeve 60 is moved (or slid) to the 2nd speed drive gear 32 side, the spline teeth 61 of the synchronizing sleeve 60 push the synchronizer spring 90. Thus, by pushing the blocking ring 80 to the dog gear 75 side via the synchronizer spring 90, the taper cone surface 88 of the blocking ring 80 and the taper cone surface 78 of the dog gear 75 are pressed against each other, between which friction torque is generated so that the dog gear 75 can start synchronous rotation.

When the synchronizing sleeve 60 further moves to the 2nd speed drive gear 32 side, the chamfer surface 61a of the spline tooth 61 of the synchronizing sleeve 60 contacts the chamfer surface 83a of the dog tooth 83 of the blocking ring 80, thereby starting to push aside the dog tooth 83. When the synchronizing sleeve 60 further moves, the chamfer surface 61a of the spline tooth 61 pushes aside the dog tooth 83 and moves forward while being slidingly in contact with the chamfer surface 83a of the dog tooth 83. Then, the contact between the chamfer surface 61a of the spline tooth 61 and the chamfer surface 83a of the dog tooth 83 is released, leading to completion of the pushing aside of the blocking ring 80. As a result, the friction torque between the blocking ring 80 and the dog gear 75 ceases to exist so as to complete the synchronous operation between the blocking ring 80 and the dog gear 75.

When the synchronizing sleeve 60 is further moved after synchronizing the synchronizing sleeve 60 with the dog gear 75 in the manner described above, the spline tooth 61 of the synchronizing sleeve 60 contacts the dog spline 76 of the dog gear 75. When synchronizing sleeve 60 is further moved, the spline tooth 61 bites into and engages with the dog spline 76. Thus, combining of the synchronizing sleeve 60 with the 2nd speed drive gear 32 is completed.

When the synchronizing sleeve 60 of the synchronous engaging device S2 driven by the hydraulic controller (or the hydraulic actuator) 6 is stroked from a release position to an engagement position based on a command input through an operation of the shifting device 9 by a driver, the transmission 2 of the present embodiment detects differential rotation speed between input side rotational speed and output side rotational speed in a stroke position after the synchronization completion position where synchronization between rotational speed of a drive gear (or output side rotational speed) and rotational speed of the input shaft 10, that is the 1st input shaft 11 or the 2nd input shaft 12, (or input side rotational speed) is judged to be complete. When the differential rotation speed is equal to or more than a predetermined threshold value, it is judged as gear whine state. When it is judged as gear whine state, damage determination index (or damage index) is calculated based on the differential rotation speed. This damage determination index is an index for determining degree of damage (or magnitude of damage) sustained by a shift gear or a synchronous engaging device (in the present case, the 2nd drive gear 32 or the synchronous engaging device S2) in the gear whine state. This damage determination index corresponding to the differential rotation speed is set for every gear position (the 1st to 8th gear, RVS) that can be set in the transmission 2, and the said damage determination index is calculated and accumulated for each gear position. Specific content of the above-mentioned control will be described in further detail below.

Figure 5:
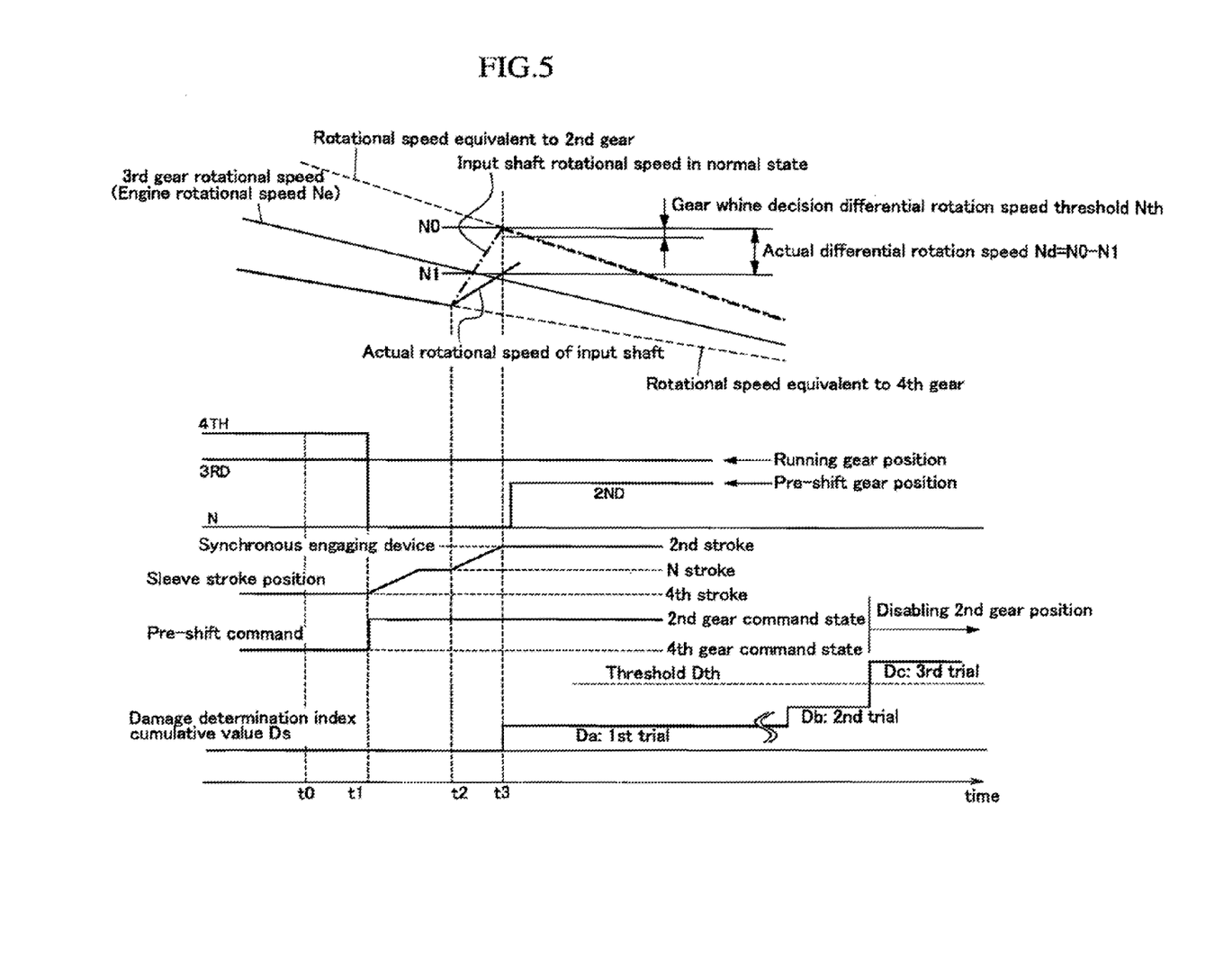
FIG. 5 is a timing chart showing changes in each value in a synchronous engagement operation of the synchronous engaging device.

FIG. 5 is a timing chart showing changes in each value in synchronous engagement operation of the synchronous engaging device S2. The synchronous engaging device S2 enables the 2nd speed drive gear 32 and the 4th speed drive gear 34 to selectively synchronically engage with the 2nd outer circumferential shaft 18. FIG. 5 here shows case when pre-shift gear position is changed from the 4th gear position to the 2nd gear position in the synchronous engaging device S2 on the 2nd outer circumferential shaft 18 while a vehicle is running in the 3rd gear position, illustrating case when determining the gear whine state in this change of pre-shift gear position. FIG. 5 also shows rotational speed equivalent to the 2nd speed drive gear 32, rotational speed equivalent to the 4th speed drive gear 34, engine rotational speed Ne (or rotational speed of the 3rd speed drive gear 33), setting status of gear positions (the 4th, the 3rd, the 2nd and neutral gear positions), stroke position of the synchronizing sleeve 60, presence or absence of pre-shift command output from the AT-ECU 5, and changes in cumulative value Ds of damage determination index. In FIG. 5, rotational speed of the 2nd outer circumferential shaft 18 in the normal state that there is no damage occurred between the synchronizing sleeve 60 of the synchronous engaging device S2 and the 4th speed drive gear 34 (or input shaft rotational speed in normal state) is shown with a dash-dot line, and actual rotational speed of the 2nd outer circumferential shaft 18 (or actual rotational speed of the input shaft) is shown with a solid line. Here, at time t0 before switching of pre-shift gear position, command of pre-shift gear position is the 4th gear position, and command of running gear position is the 3rd gear position. From that state, at time t1, command of pre-shift gear position becomes the 2nd gear position. As a result, stroke position of the synchronizing sleeve 60 first moves from engagement position of the 4th gear position to the neutral gear position, and subsequently, at time t2, moves from the neutral gear position to engagement position of the 2nd gear position. Thus, rotational speed of the 2nd outer circumferential shaft 18 (or the input shaft) begins to rise from rotational speed equivalent to the 4th speed drive gear 34 to rotational speed equivalent to the 2nd speed drive gear 32.

Then, stroke position of the synchronizing sleeve 60 reaches synchronization completion position at time t3. This synchronization completion position is a position where synchronization between rotation of the 2nd outer circumferential shaft 18 and rotation of the 2nd speed drive gear 32 is judged to be complete, which is, more specifically, balk completion position where an end surface (or a chamfer surface) 61a of the spline 61 provided in the synchronizing sleeve 60 contacts the end surface (or the chamfer surface) 83a of the dog tooth 83 provided on the 2nd speed drive gear 32 side. Rotational speed N0 in normal state and actual rotational speed N1 of the 2nd outer circumferential shaft 18 at this time (time t3) are compared with each other so as to calculate their differential rotation speed $Nd=N0-N1$. When the calculated differential rotation speed Nd is more than gear whine decision threshold value Nth (Nd>Nth), it is judged as gear whine state. When it is judged as gear whine state, damage determination index D is calculated based on the differential rotation speed Nd. In addition, rotational speed N0 of the 2nd outer circumferential shaft 18 in normal state at time t3 when synchronization between the rotation of the 2nd outer circumferential shaft 18 and the rotation of the 2nd speed drive gear 32 is determined to have completed is rotational speed equivalent to rotational speed (or output side rotational speed) corresponding to the 2nd speed drive gear 32 at the time t3.

The example given in FIG. 5 shows case of downshift switching from the 4th gear position to the 2nd gear position as switching of pre-shift gear position. In this downshift switching of pre-shift gear position, rotation speed corresponding to a gear position after switching is higher than rotation speed corresponding to a gear position before switching. Therefore, differential rotation speed Nd between rotational speed N0 of the 2nd outer circumferential shaft 18 in normal state (where damage has not occurred to the synchronizing sleeve, drive gears, etc.) and actual rotational speed N1 of the 2nd outer circumferential shaft 18 becomes a positive value (Nd=N0−N1>0). On the other hand, in the transmission mechanism 2a of the present embodiment, for example, there is another case that switching of pre-shift gear position is carried out by upshifting from the 2nd gear position to the 4th gear position, etc. In that case, rotational speed corresponding to a gear position after switching is lower than rotational speed corresponding to a gear position before switching. Therefore, in this case, differential rotation speed Nd between rotational speed N0 of the 2nd outer circumferential shaft 18 in normal state (where damage has not occurred to the synchronizing sleeve, drive gears, etc.) and actual rotational speed N1 of the 2nd outer circumferential shaft 18 becomes a negative value (Nd=N0−N1<0). Thus, depending on number of pre-shift gear positions to be switched, differential rotation speed Nd between rotational speed N0 of the 2nd outer circumferential shaft 18 in normal state and actual rotational speed N1 can take both positive and negative values. Therefore, in the following description, as differential rotation speed Nd between rotational speed N0 of the 2nd outer circumferential shaft 18 in normal state and actual rotational speed N1, absolute value |Nd| of the differential rotation speed Nd will be used.

FIG. 6 is a graph showing relationship between differential rotation speed |Nd| between input rotation and output rotation for each gear position, and damage determination index D. As shown in the same figure, damage determination index D corresponding to differential rotation speed |Nd| is set for each gear position. Thus, when the differential rotation speed |Nd| is calculated for each gear position, damage determination index D based on the differential rotation speed |Nd| is calculated.

Calculation of the damage determination index D is executed every time when differential rotation speed |Nd| exceeds gear whine decision threshold value Nth in synchronous engagement operation for each gear position. Then, damage determination index D calculated in each synchronous engagement operation is accumulated for each gear position. In the examples shown in FIG. 5 and FIG. 6, damage determination index Da calculated in 1st synchronous engagement operation, damage determination index Db calculated in 2nd synchronous engagement operation, and damage determination index Dc calculated in 3rd synchronous engagement operation are accumulated. When cumulative value Ds of damage determination index D accumulated in this manner exceeds threshold value Dth set beforehand, at that time, predetermined measures (fail-safe measures) for preventing damages to the synchronous engaging device S2 are carried out. Here, as predetermined measures, control can be performed to disable engagement of a corresponding gear position or to store data recommending replacement of a corresponding synchronous engagement device and its peripheral parts to a memory 7, etc.

Figure 7:
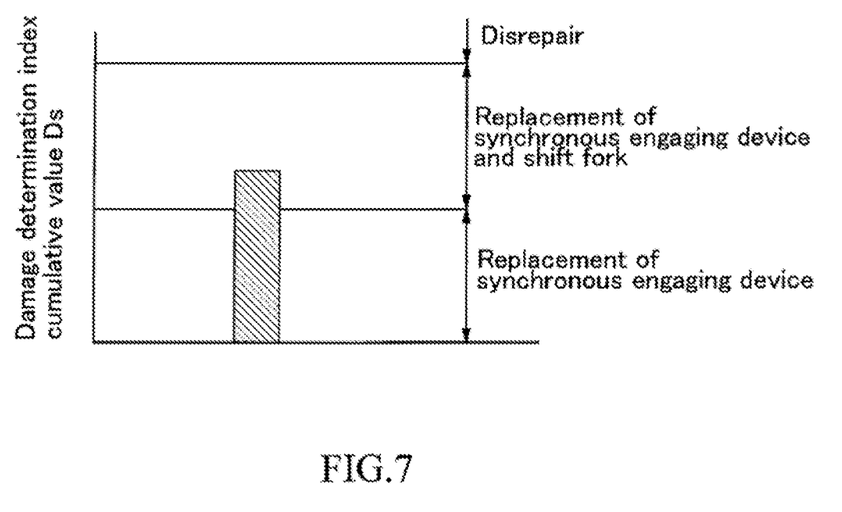
FIG. 7 is a graph showing the relationship between damage determination indices and replacement parts.

FIG. 7 is a graph showing relationship between cumulative value Ds of damage determination index Ds and the synchronous engaging device S2 including its peripheral replacement parts. As shown in the same figure, depending on the accumulated value Ds of damage determination index, there are cases that only the synchronous engaging device S2 is replaced and both the synchronous engaging device S2 and shift fork are replaced. In this manner, replacement of parts to be replaced according to cumulative value Ds of damage determination index enables to carry out appropriate parts replacement according to degree of damage sustained by the synchronous engaging device S2.

Figure 8:
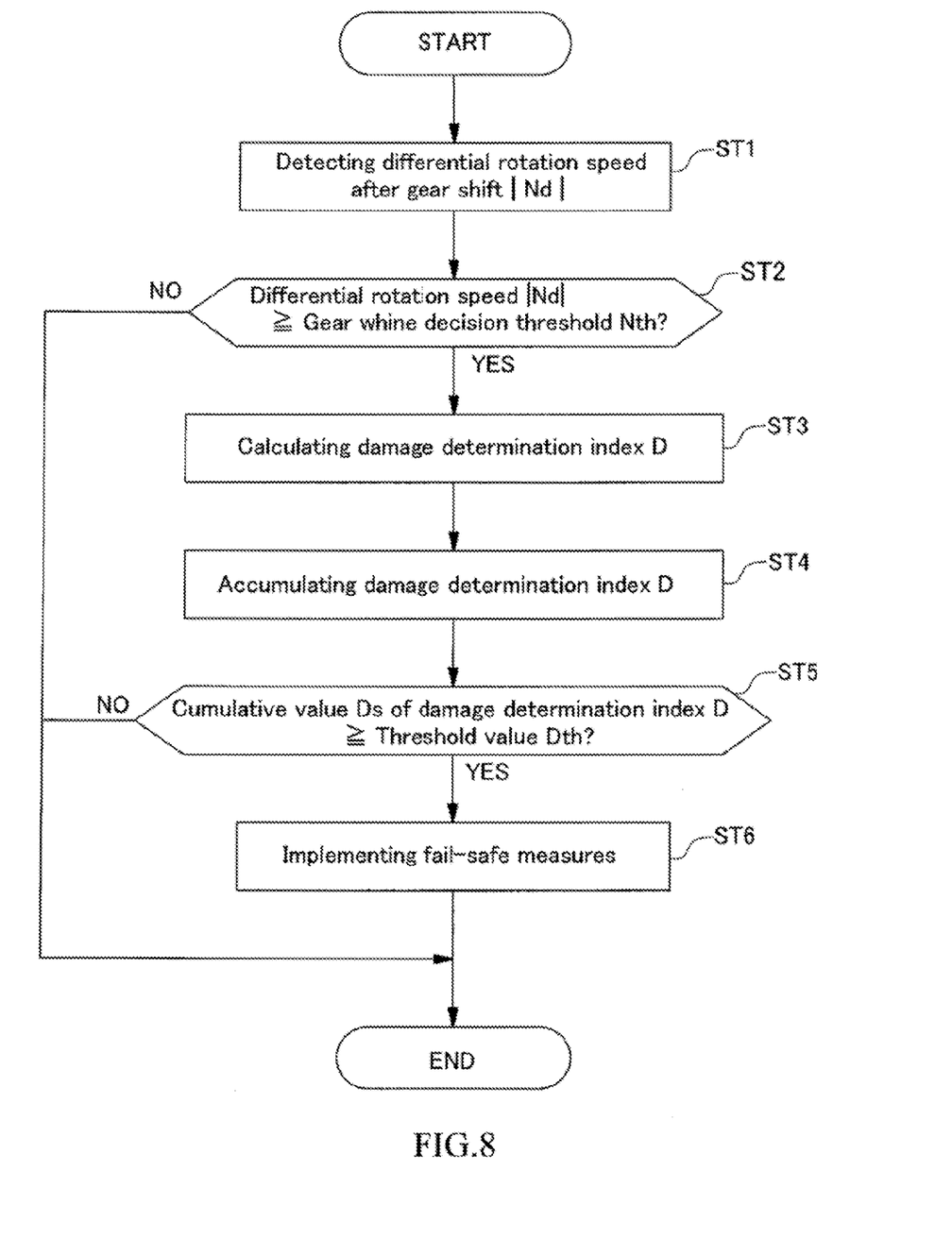
FIG. 8 is a flowchart showing the procedure for calculation of a damage determination index in synchronous clutch operation of the synchronous engaging device.

FIG. 8 is a flowchart showing procedure for calculating damage determination index D in a synchronous engagement operation of the synchronous engaging device S2. In this procedure, a first step detects differential rotation speed after gear shift (or differential rotation speed between rotational speed N0 in normal state and actual rotational speed N1) |Nd| is detected (ST1). A second step compare the detected differential rotation speed |Nd| with gear whine decision threshold value Nth (ST2). As a result, when the differential rotation speed |Nd| is not equal to or more than the gear whine decision threshold value Nth (NO), the process ends as it is. On the other hand, when the differential rotation speed |Nd| is equal to or more than the gear whine decision threshold value Nth (|Nd| a Nth) (YES), a third step calculates damage determination index D corresponding to the differential rotation speed |Nd| (ST3), and then a fourth step accumulates the calculated damage determination index D for each gear position (ST4). Then, a fifth step determines whether or not the cumulative value Ds of damage determination index D calculated for each gear position is equal to or more than predetermined threshold value Dth (ST5). As a result, when cumulative value Ds of damage determination index D is less than threshold value Dth (NO), the process ends as it is. On the other hand, if cumulative value Ds of damage determination index D is equal to or more than threshold value Dth (Ds≧Dth) (YES), a sixth step implements fail-safe measures for the synchronous engaging device S2 of the gear position (ST6). As described above, here, control can be performed as the fail-safe measures to disable the gear position or to store data recommending replacement of parts of synchronous engaging device corresponding to the gear position to the memory 7.

Figure 9:
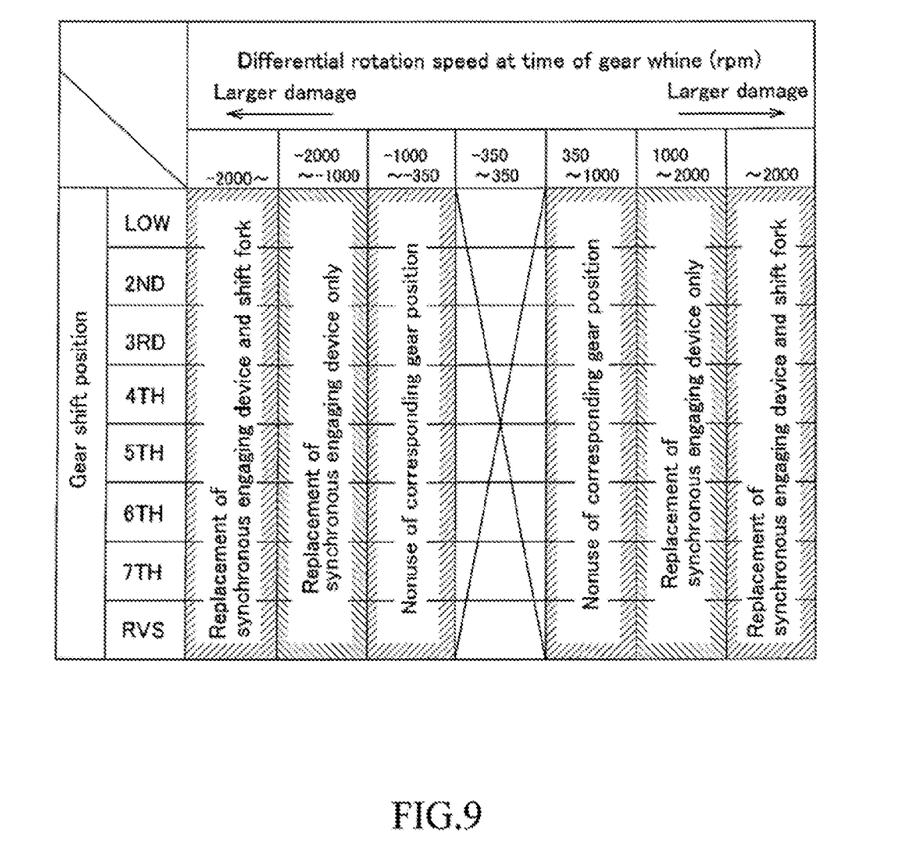
FIG. 9 is a diagram illustrating the method for counting damage determination index for each gear position.

FIG. 9 is a figure for describing procedure for counting damage determination index for each gear position. As shown in the same figure, a differential rotation speed area at time of gear whine for each gear position is mapped (or zoned), and the said damage determination index is counted for each area on the map. In other words, damage determination index D is accumulated (or stored) as data divided into zones for every multiple of gear positions. When the number of counts of damage determination index in any area exceeds a preset number, measures such as disabling use of a corresponding gear position or storing data, recommending replacement of parts of a corresponding gear or a synchronous engaging device to the memory 7, are taken.

In addition, the area map shown in FIG. 9 is pre-stored in the memory 7. In the example of the area map shown in FIG.

9; in an area where differential rotation speed is low at time of gear whine, judgment is made to disable a corresponding gear position; in an area where a differential rotation speed is relatively high at time of gear whine, judgment is made to replace only the synchronous engaging device; and further in an area where differential rotation speed is high at time of gear whine, judgment is made to replace both synchronous engaging device and shift fork. In addition, here, judgment contents based on each of the differential rotation speeds should be stored as data in the memory 7. Further, when vehicle enters a service center or a repair workshop, data of said judgment contents stored in the memory 7 should be enabled to be retrieved at time of vehicle diagnosis at the service center or the repair workshop. This allows for identifying parts in need of repair or replacement by section of gear whine at time of vehicle inspection or repair.

In addition, as shown in FIG. 9, when counts of damage determination index for each gear position are mapped, it becomes possible to properly ascertain how much damage a gear or a synchronous engaging device corresponding to which gear position has sustained. Therefore, it is possible to take measures such as disabling engagement of a gear position according to degree of damage sustained by a synchronous engaging device or a gear, or storing data for prompting parts replacement.

As described above, according to the control unit for synchronous engaging device of the present embodiment, when differential rotation speed between input rotation and output rotation is equal to or more than a threshold value in a stroke position after synchronization completion position in a synchronous engaging device, it is judged as occurrence of gear whine so that damage determination index can be calculated on basis of the differential rotation speed, taking into account degree of damage sustained by a gear or each part of the synchronous engaging device. This enables, when gear whine occurs to a synchronous engaging device, to take measures such as disabling a gear to which the gear whine is occurring with appropriate safety factor before leading to damage to each part of the synchronous engaging device and gathering data recommending parts replacement. On the other hand, this enables to effectively prevent inappropriate measures such as disabling a gear or a synchronous engaging device that is actually usable or gathering data recommending replacement of parts that need not be replaced.

Further, the damage determination index corresponding to the differential rotation speed is set for multiple gear positions that can be set in the transmission 2, thereby accumulating damage determination indices calculated for every multiple of gear positions. Thus, when any gear or synchronous engaging device that constitutes each gear position sustains damage, it is possible to properly ascertain degree of damage and to take measures such as disabling the gear position according to the degree of damage. Therefore, inappropriate measures such as disabling a gear position that is actually usable and allowing use of a gear position that should actually be disabled can be avoided.

Further, in the control unit of the present embodiment, the synchronization completion position where synchronization between rotation of the 2nd drive shaft (the input shaft) 18 and rotation of the 2nd drive gear 32 is judged to be complete is set as balk completion position where the synchronizing sleeve 60 contacts the 2nd drive gear 32 side. In normal state where no part of the synchronous engaging device S2 is subject to damage such as wear, there is no differential rotation speed between the input side and the output side after the balk completion position. Therefore, setting the balk completion position as synchronization completion position and thus calculating damage determination index based on differential rotation speeds of positions thereafter enables to more effectively determine a degree of damage sustained by the synchronous engaging device S2.

Also, in the control unit of the present embodiment, when cumulative value Ds of damage determination index accumulated for each gear position is equal to or more than threshold value Dth, then control is carried out to disable engagement operation of the gear position. In this manner, by disabling engagement operation of a gear position where cumulative value Ds of damage determination index Ds becomes equal to or more than threshold value Dth, further occurrences of gear whine in the gear position can be prevented.

Moreover, while continuation of engagement operation of a gear position where gear whine is occurring may lead to damage to gear or parts of synchronous engaging device, disablement of engagement of the gear position can avoid damage to the gear or the synchronous engaging device.

Further, as shown in FIG. 9, estimation of presence or absence of malfunction of each component part of a synchronous engaging device or necessity or no need of their replacement is associated with an above-mentioned damage determination index D. Depending on magnitude of the damage determination index D, type and number of parts that are estimated to be in malfunction or in need of replacement can be determined. This enables to store appropriate data related to replacement of component parts depending on degree of damage sustained by the synchronous engaging device.

While the embodiments of the invention have been described, it is to be understood that the invention is not limited to the foregoing embodiments. Rather, the invention can be modified to incorporate any number of variations or alterations within the scope of claims and the scope of technical concept described in the specification and the drawings thereof. For example, the above-described embodiment has provided the synchronous engaging device S2 on the 1st outer circumferential shaft (or the input shaft) 18 included by the transmission 2 as an example of the synchronous engaging device to be controlled by the control unit in the present invention. In addition to this example, the synchronous engaging device to be controlled by the control unit according to the present invention can also be a synchronous engaging device for carrying out synchronous engagement operation between an output shaft and a shift gear on the output shaft.

Further, the above-described embodiment has provided a twin-clutch type automatic transmission having a 1st and a 2nd clutches and a 1st and a 2nd input shafts that are arranged parallel with each other as an example of the transmission according to the present invention. Specific configurations of transmission according to the present invention are not limited to the transmission 2 described in the above embodiment but may extend to transmissions with other configurations. Therefore, for example, the present invention can be applied to such a transmission that is configured to arrange two input shafts coaxially (in concentric shape) and to a transmission of the type that does not install a torque converter between an input shaft and an engine so as to control starting of a vehicle with two clutches, both of which are specific configurations for a twin-clutch type automatic transmission.

Furthermore, the present invention is not limited to a control unit for controlling an above-mentioned twin-clutch type automatic transmission, but may be applied to a control unit for controlling an automatic manual transmission (AMT) where, in accordance with shift switch operations by a vehicle driver, gear positions are changed by activating an actuator that drives a sleeve of a synchronous engaging device, on the condition that synchronous engaging device is one that enables to switch an engagement position and a release position between an input gear and an output gear, and control unit for a transmission is one that has a control section that controls synchronous engagement operation by the synchronous engaging device.

What is claimed is:

1. A control unit for synchronous engaging device, comprising:
   an input shaft of a transmission;
   one or more input gears on the input shaft to transmit rotation of the input shaft;
   an output shaft in parallel with the input shaft;
   one or more output gears on the output shaft to engage with each of the one or more input gears;
   a synchronous engaging device having a sleeve movable between an engaging position and a release position where said engaging position is released, said engaging position engaging by:
      synchronizing rotation of one of the input gears with rotation of the input shaft, or
      synchronizing rotation of one of the output gears with the output shaft;
   an actuator driving the sleeve;
   a controller that controls operation of the synchronous engaging device;
   a rotation detection sensor that detects an input rotation on the input shaft and an output rotation on the output shaft;
   a position information acquisition sensor for acquiring information related to a position of the sleeve; and
   a memory which stores a damage determination index for determining degree of damage of the synchronous engaging device;
   wherein, when the sleeve is moved from the release position to the engaging position in response to a shift request, the controller calculates a differential rotation speed between the input rotation and the output rotation after a synchronization completion position is reached,
   wherein the synchronization completion position is a position where either
      synchronization of rotation of the one of the input gears with rotation of the input shaft is complete, or
      synchronization of rotation of the one of the output gears with the output shaft is complete, and
   wherein, when the differential rotation speed is equal to or more than a first predetermined threshold value, the controller calculates the damage determination index based on the differential rotation speed and then accumulates the damage determination index for each gear position before determining whether or not a cumulative value of the damage determination indices calculated for each gear position is equal to or more than a second predetermined threshold value.

2. The control unit for synchronous engaging device as claimed in claim 1:
   wherein a plurality of input gears and a plurality of output gears are installed;
   wherein a plurality of gear positions can be set by engagement switching of said plurality of input gears and said plurality of output gears;
   wherein the damage determination index based on the differential rotation speed is set for each one of said plurality of gear positions; and
   wherein the controller respectively accumulates the damage determination indices calculated for each one of said plurality of gear positions to respectively obtain the cumulative value of the damage determination indices calculated for each one of the gear positions.

3. The control unit for synchronous engaging device described in claim 1:
   wherein the synchronization completion position is a position where the sleeve contacts the one of the input gears or the one of the output gears.

4. The control unit for synchronous engaging device described in claim 2:
   wherein when the cumulative value of the damage determination indices calculated for each one of the gear positions is equal to or more than the second predetermined threshold value, an engagement operation of a gear position corresponding to the cumulative value is disabled.

5. The control unit for synchronous engaging device claimed in claim 4:
   wherein estimation of presence or absence of a malfunction of each component part of said synchronous engaging device, said one or more input gears or said one or more output gears, or necessity or unnecessity of replacement of said synchronous engaging device, said one or more input gears or said one or more output gears, is associated with said damage determination index; and
   wherein, depending on a magnitude of the damage determination index, the controller determines a type and number of parts that are estimated to be malfunctioning or in need of replacement.

\* \* \* \* \*